Patented Oct. 12, 1948

2,450,959

UNITED STATES PATENT OFFICE 2,450,959

SILK SCREEN PRINTING INK

William Heinecke, New York, N. Y.

No Drawing. Application August 11, 1945,
Serial No. 610,403

8 Claims. (Cl. 106—30)

This invention relates to silk screen printing inks and more particularly to quick drying water soluble inks which will not cause warpage or swelling of paper or cardboard when applied thereto.

Water color or inks have been previously used in screen printing but their use has been generally confined to single color prints. Such inks "dry" largely by absorption and in so doing cause a warping or wrinkling of the paper so that different colors cannot be applied by multi-color processes because of failure to obtain the necessary registry of successive colors. For multicolor prints it has been necessary heretofore to use slow drying oil paints both to avoid warping of the foundation and to prevent clogging of the screen. Such a print must be thoroughly dried before successive colors can be applied so that if three colors are used the total drying time usually is about three days, and oil colors lack the depth obtained by water colors.

One object of this invention is to provide a quick drying ink which can be forced through a silk screen.

Another object is to provide such an ink which will dry within a period of about ten minutes without warpage of the printed sheet.

Another object is to provide an ink which may be removed from the printing screen by the use of water alone.

Another object is to provide an ink which will dry on a sheet by exposure to air and form a water insoluble ink.

The inventive features for the accomplishment of these and other objects are shown herein in connection with an ink which briefly stated includes a resin and alkali reactive therewith, a bodying agent, coloring matter and proportioned quantities of high volatile and slightly volatile solvents.

The resin is preferably of acidic nature such as shellac, sandarac, gum or wood rosin, mastic, dammar, dragon blood, elemi, or copal. Synthetic resins such as 3-isopropyl-6-methyl-3,6 endoethylene ("Petrex"), phenol-coumarone-indene condensates ("Nevillac") are preferable though polyvinyl acetate, acrylic ester resins and other low acid number resins may be used.

The alkali material is preferably an amine such as triethanolamine, diethanolamine, or monoethanolamine, alkyl amines such as propyl amine, butyl amine triethylamine, di-propylamine, and even amyl amine. Ammonia may likewise be used.

For a vehicle I use a rapidly evaporating solvent such as isopropyl alcohol (vapor pressure 35 mm. at 20° C.) since its solvent properties for resin are great. However it is generally desirable to reduce the rate of evaporation below that obtained when highly volatile solvents are used lest the screen become unduly clogged. To reduce this rapid evaporation without causing the ink to warp the paper I may add additional triethanolamine or add another compatible liquid of much lower vapor pressure and which is substantially non-hygroscopic. Octyl alcohol (vapor pressure 0.36 mm.) is well suited for this purpose. Instead of octyl alcohol I may use hexanol (V. P. 0.98), glycol di acetate (V. P. 0.38), propylene glycol (V. P. 0.18), ethylene glycol (V. P. 0.12), diethylene glycol (V. P. 0.01), ethyl ethylene glycol ether ("Cellosolve" V. P. 3.8), diethylene glycol monoethyl ether (V. P. 0.2), or 2-methyl-2-4 pentanediol all having a vapor pressure less than 4 mm. at 20° C.

Instead of the isopropyl alcohol as a rapidly evaporating component I may use ethyl alcohol, butyl ether, dioxane, ethylene dichloride, propylene dichloride.

The ink preferably contains a filler or bodying agent such as colloidal clay, diatomaceous silica, or whiting and may be employed in such quantities known to those skilled in the art as will give a suitable consistency for various types of work.

The use of a filler results in a dull finish though, of course, if a glossy surface on the dried ink or paint is desired the filler may be omitted.

The coloring matter may be carbon black, lakes, pigments or dyes having a particle size sufficiently small to permit their passage through the silk screen. If the concentration of alkali present is large the coloring matter must, of course, be alkali resistant.

The ratio of highly volatile vehicle having a vapor pressure of the order of 25 to 50 mm. to the slowly volatile vehicle determines to a great extent the drying time. The ratio of the amount of less volatile vehicle to that of the more volatile may be varied between 25:10 and 5:20. Of course vapor pressure at room temperature alone is not absolutely indicative of rates of evaporation for the heats of vaporization must be considered. In general the highly volatile component boils below about 110° C. and the less volatile boils above about 140° C. at 760 mm.

However if drying time is of little or no importance or drying heat is to be applied considerably less volatile solvents may be used. Conversely if solvent evaporation from the screen is minimized, as when the ink side of the screen is provided with a vaportight cover, the solvents may have much lower boiling points.

To prepare the inks the resin is well mixed with the alkaline amine to effect substantial neutralization so that the more stubborn acid types become soluble in the vehicle or solvent. Next the less volatile solvent and then bodying agents and coloring matter are added with grinding if necessary. Finally the volatile solvent is added to dilute to the desired consistency.

Specific illustrations, shown by way of example only, of my ink are as follows:

*Example I*

| | Grams |
|---|---|
| Shellac | 100 |
| Diethanolamine | 8 |
| Isopropyl alcohol | 200 |
| Octyl alcohol | 50 |
| Bentonite | 125 |
| Carbon black | 75 |

Drying time about 15 minutes.

*Example II*

| | Grams |
|---|---|
| Sandarac resin | 100 |
| Triethanolamine | 18 |
| Isopropyl alcohol | 100 |
| Octyl alcohol | 250 |
| Colloidal clay | 50 |
| Pigment | 50 |

Drying time about 90 minutes.

*Example III*

| | Grams |
|---|---|
| Copal | 175 |
| Triethanol amine | 30 |
| Isopropyl alcohol | 100 |
| 2-methyl-2,4-pentanediol | 200 |
| Bodying agent and pigment | 200 |

Drying time about 60 minutes.

*Example IV*

| | Grams |
|---|---|
| Rosin | 175 |
| Triethanol amine | 16 |
| Isopropyl alcohol | 200 |
| Octyl alcohol | 50 |
| Body and pigment | 250 |

Drying time about 20 minutees.

*Example V*

| | Grams |
|---|---|
| Shellac | 100 |
| Triethanol amine | 16 |
| Isopropyl alcohol | 200 |
| Mono ethyl ether diethylene glycol | 75 |
| Body and pigment | 150 |

Drying time about 10 minutes.

*Example VI*

| | Grams |
|---|---|
| Phenol-coumarone indene resin | 175 |
| Amylamine | 10 |
| Ethyl alcohol | 200 |
| Hexanol | 75 |
| Bodying agent and pigment | 150 |

Drying time about 15 minutes.

Of course various combinations of resins may be used instead of a specific resin as shown in the above examples. Likewise combinations of slowly evaporating solvents and combinations of rapidly evaporating solvents may be used. I have found that pH values of the ink between 7.5 and 11.5 are especially desirable for good results but the pH may be carried from 7.0 to 14.0.

The inks as illustrated above may be removed from the printing screen by the use of water alone so that the fire hazard attending the usual removal of conventional inks by naphtha or other explosive solvents is eliminated.

Of course the ink may be modified by the addition of proteins and carbohydrates to adjust the physical and chemical properties of the product.

While specific solvents have been noted I may also use ketones or esters of an aromatic or aliphatic nature. Isopropyl alcohol is preferred as to volatile solvent because of its relatively high boiling point, non-toxic vapor and lack of offensive odor but since these features may vary in importance many other solvents may be used.

Drying times of the various specific examples of inks herein were obtained at room temperature. The exact nature of drying is not understood. The initial drying is evidently merely due to evaporation of solvent, for large quantities of the ink, such as that adhering to the screen, may be removed by a simple water wash. However, after a printed surface has remained exposed to the atmosphere the ink becomes insoluble in water. Presumably this is due to a liberation of the resin from a resin-amine salt under the influence of carbon dioxide in the air. As long as the surface area of a quantity of ink is small and much solvent is present little carbon dioxide is absorbed. When, however, that same quantity of ink is spread thin and the solvent removed, by evaporation and/or soaking into paper, there is a much greater surface for carbon dioxide absorption.

While my composition is especially efficient as a silk screen printing ink it may be used as a paint and applied in the usual manners of painting. Example I, containing carbon black, may be used for resurfacing black boards which may be subsequently washed with water.

The invention claimed is:

1. A silk screen printing ink consisting of a mixture of the reaction product of 100 g. shellac and 8 g. diethanol amine dissolved in a mixture of 200 g. iso propyl alcohol and 50 g. octyl alcohol; 125 g. bentonite; and 75 grams of carbon black, said ink being characterized by an absence of warping action on paper when applied thereto, removable from the screen by a water wash and a drying time of about 15 minutes at room temperature.

2. A silk screen water dispersible printing ink consisting of the reaction product of an acidic resin and an amine and dissolved in a mixture of two solvents, one solvent being a lower alkanol having a boiling point below 110° C. and the other being an aliphatic alcohol having a vapor pressure less than 4 mm. at 20° C. the ratio of the first mentioned solvent to the second being between 10:25 and 20:5 parts by weight; and a finely divided pigment powder, said ink being substantially anhydrous.

3. An ink as in claim 2 the second solvent being 2-methyl 2,4, pentanediol.

4. An ink as in claim 2, said alkanol being ethanol.

5. An ink as in claim 2, said alkanol being isopropanol.

6. An ink as in claim 2, said aliphatic alcohol being diethylene glycol.

7. An ink as in claim 2, said aliphatic alcohol being octyl alcohol.

8. An ink as in claim 2 and a finely divided inert filler powder to impart a dull finish to the ink when dry.

WILLIAM HEINECKE.

REFERENCES CITED

The following references are of record in the file of this patent:

UNITED STATES PATENTS.

| Number | Name | Date |
|---|---|---|
| 1,890,996 | Kurz | Dec. 13, 1932 |
| 2,136,985 | Stocker | Nov. 15, 1938 |
| 2,170,198 | Hadert | Aug. 22, 1939 |
| 2,227,720 | Kallander | Jan. 7, 1941 |
| 2,245,100 | Bernstein | June 10, 1941 |
| 2,336,983 | Erickson | Dec. 14, 1943 |
| 2,343,781 | Locke | Mar. 7, 1944 |
| 2,346,969 | Jeuck | Apr. 18, 1944 |
| 2,385,613 | Davis | Sept. 25, 1945 |
| 2,385,737 | Smith | Sept. 25, 1945 |

FOREIGN PATENTS

| Number | Country | Date |
|---|---|---|
| 598,764 | Germany | June 16, 1934 |